US012420941B2

(12) United States Patent
Lefebvre et al.

(10) Patent No.: US 12,420,941 B2
(45) Date of Patent: Sep. 23, 2025

(54) AIRCRAFT ENGINE WITH EXHAUST HAVING REMOVABLE DEFLECTOR

(71) Applicant: PRATT & WHITNEY CANADA CORP., Longueuil (CA)

(72) Inventors: Guy Lefebvre, St-Bruno-de-Montarville (CA); Christopher Gover, Longueuil (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/060,659

(22) Filed: Dec. 1, 2022

(65) Prior Publication Data
US 2024/0182178 A1     Jun. 6, 2024

(51) Int. Cl.
*F02C 6/12*         (2006.01)
*B64D 33/04*        (2006.01)
(Continued)

(52) U.S. Cl.
CPC ............. *B64D 33/04* (2013.01); *F01D 9/041* (2013.01); *F01D 9/048* (2013.01); *F01N 13/08* (2013.01);
(Continued)

(58) Field of Classification Search
CPC .................................. F02B 41/10; F02C 6/12
(Continued)

(56) References Cited

U.S. PATENT DOCUMENTS

| 4,742,683 A | * | 5/1988 | Heminghous | ........... F02B 41/10 60/624 |
| 4,996,839 A | * | 3/1991 | Wilkinson | ................ F02C 6/12 60/605.1 |

(Continued)

FOREIGN PATENT DOCUMENTS

| CN | 107725195 | 2/2018 |
| GB | 479822 | 2/1938 |

OTHER PUBLICATIONS

Eric Tegler, "This P-51 Mustang replica flies with a Honda Odyssey engine", Sep. 15, 2015, autoblog website, downloaded from "https://www.autoblog.com/2015/09/15/p-51-mustang-replica-with-honda-odyssey-v6-engine/" on Feb. 22, 2024, pp. 1-2. (Year: 2015).*

*Primary Examiner* — Todd E Manahan
*Assistant Examiner* — Marc Amar
(74) *Attorney, Agent, or Firm* — NORTON ROSE FULBRIGHT CANADA LLP

(57) ABSTRACT

An aircraft engine, comprising a thermal engine, an axial turbine having a turbine inlet, and an exhaust assembly fluidly connecting the thermal engine to the axial turbine. The exhaust assembly includes a housing and a deflector removably mounted within the housing. The deflector has circumferentially distributed vanes. The deflector is a first deflector, having a first set of geometric characteristics, that is removable from the housing and replaceable by a second deflector having a second set of geometric characteristics different from the first set of geometric characteristics. The first deflector is one of a first class of deflectors and the (Continued)

second deflector is one of a second class of deflectors, the first and second class of deflectors respectively defining first and second exhaust flow profiles that differ from each other.

16 Claims, 9 Drawing Sheets

(51) Int. Cl.
*F01D 9/04* (2006.01)
*F01N 13/08* (2010.01)
*F02B 41/10* (2006.01)

(52) U.S. Cl.
CPC ............... *F02B 41/10* (2013.01); *F02C 6/12* (2013.01); *F05D 2260/96* (2013.01)

(58) Field of Classification Search
USPC ....................................................... 415/208.2
See application file for complete search history.

(56) References Cited

U.S. PATENT DOCUMENTS

| | | | |
|---|---|---|---|
| 8,001,792 B1 | 8/2011 | Dvorak et al. | |
| 9,243,648 B2 | 1/2016 | Clemons et al. | |
| 9,896,998 B2 | 2/2018 | Thomassin et al. | |
| 2004/0227016 A1* | 11/2004 | Yagi | B05B 1/265 239/524 |
| 2005/0066657 A1* | 3/2005 | Zollinger | F02C 6/12 60/602 |
| 2009/0288422 A1* | 11/2009 | Cernay | F23R 3/60 60/800 |
| 2010/0180592 A1* | 7/2010 | Williams | F01D 17/165 60/602 |
| 2012/0051899 A1 | 3/2012 | Petitjean et al. | |
| 2012/0088201 A1* | 4/2012 | Marquez | F23R 3/28 431/350 |
| 2012/0294706 A1* | 11/2012 | Tanaka | F01D 11/003 415/170.1 |
| 2014/0147278 A1* | 5/2014 | Demolis | F01D 17/165 416/147 |
| 2014/0208741 A1* | 7/2014 | Svihla | F02B 37/00 417/406 |
| 2016/0245085 A1* | 8/2016 | Lim | F01D 1/32 |
| 2016/0245161 A1* | 8/2016 | Thomassin | F02C 7/14 |
| 2017/0328234 A1* | 11/2017 | Rodriguez Erdmenger | F01D 17/141 |
| 2019/0153882 A1* | 5/2019 | Haas | F04D 29/444 |
| 2021/0310367 A1* | 10/2021 | Clanahan | F16C 33/125 |

* cited by examiner

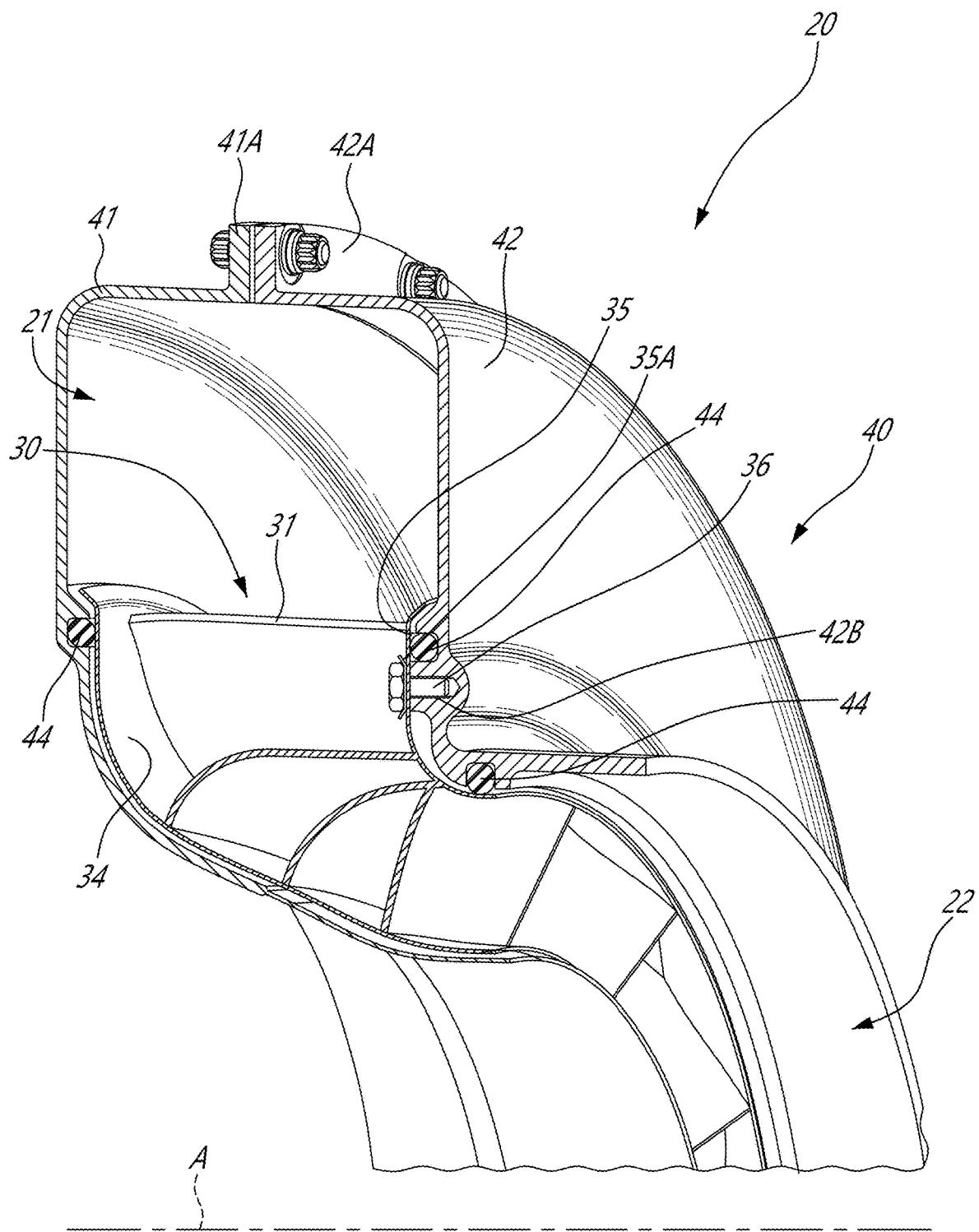

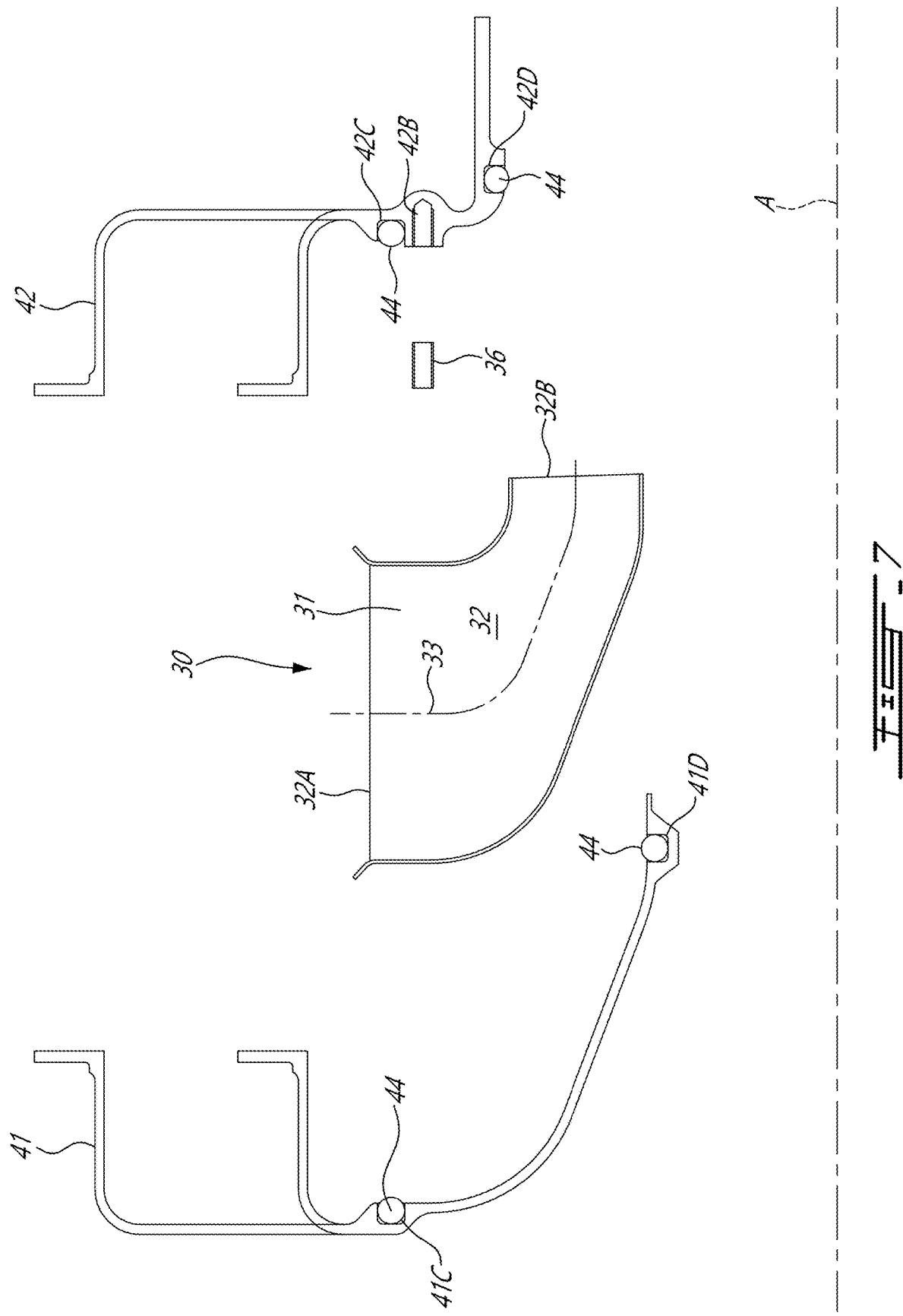

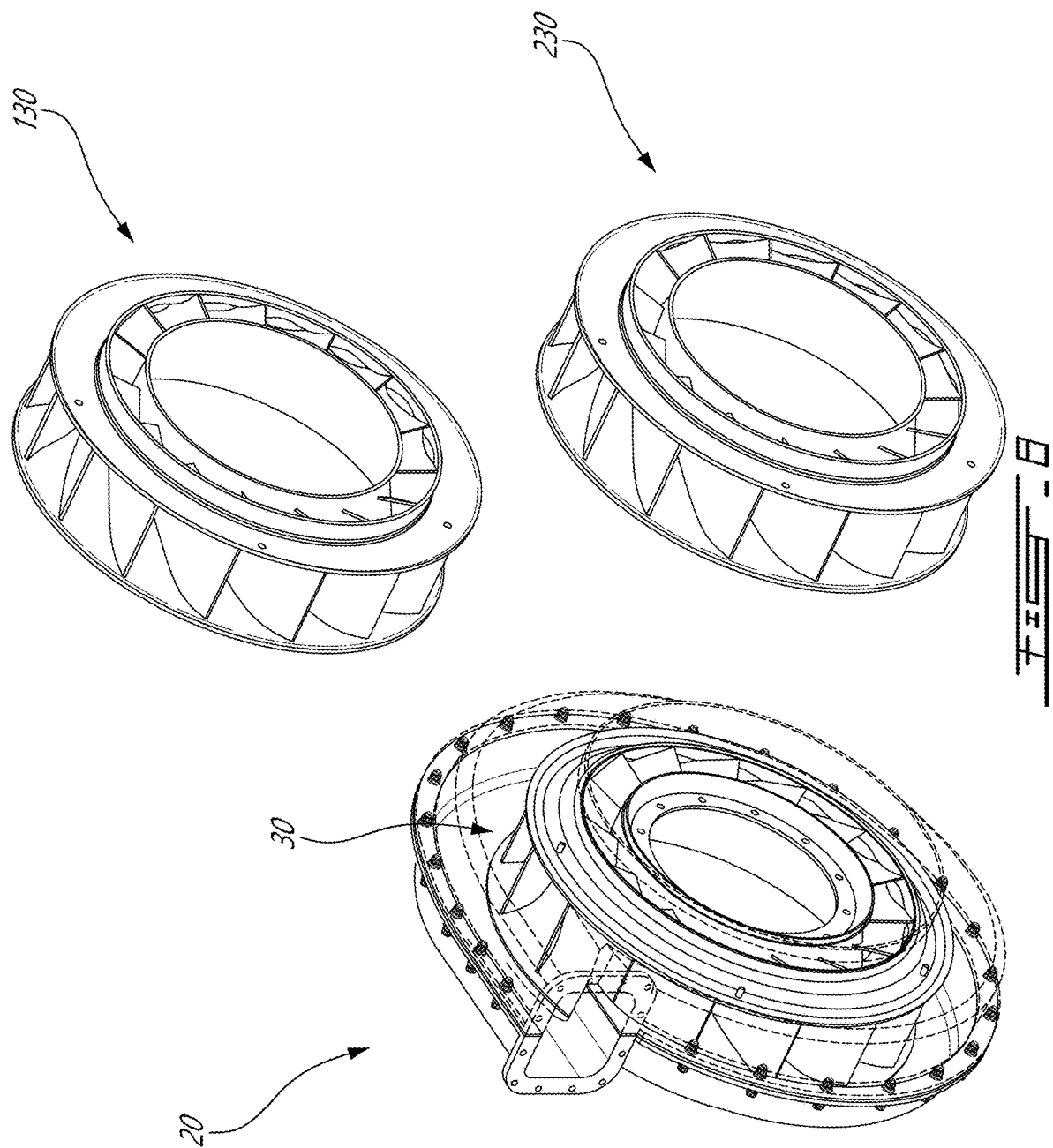

900 ─┐

902 — Determine that a parameter indicative of a performance of the deflector is below a given threshold 904 — Improve performance of the aircraft engine by removing the deflector from the housing and replacing the deflector by a substitute deflector, including selecting the substitute deflector from a set of classified deflectors, the set of classified deflectors including a first class of deflectors and at least a second class of deflectors, the first class of deflectors and the at least second class of deflectors differing from each other by one or more geometric characteristics which define a first flow profile for the first class of deflectors and a second flow profile for the second class of deflectors, the first flow profile being different than the second flow profile.

FIG. 9

AIRCRAFT ENGINE WITH EXHAUST HAVING REMOVABLE DEFLECTOR

TECHNICAL FIELD

The disclosure relates generally to aircraft engines and, more particularly, to exhaust assembly of such engines.

BACKGROUND

Aircraft engines may include turbine sections used to extract power from combustion gases. In some engine architectures, scroll air distributors are used to receive the combustion gases and to orient them in a suitable manner before the combustion gases meet stator vanes or rotor blades of the downstream turbine section(s).

SUMMARY

In accordance with one aspect, there is provided an aircraft engine, comprising: a thermal engine having an engine inlet and an engine outlet; an axial turbine having a turbine inlet; and an exhaust assembly fluidly connecting the engine outlet of the thermal engine to the turbine inlet of the axial turbine, the exhaust assembly having a exhaust inlet fluidly connected to the engine outlet and an exhaust outlet fluidly connected to the turbine inlet, the exhaust assembly including: a housing extending circumferentially about a central axis; and a deflector removably mounted within the housing, the deflector having vanes circumferentially distributed about the central axis, flow passages interspaced between the vanes, the flow passages curving from passages inlets to passage outlets, axial components of passage axes of the flow passages increasing from the passage inlets to the passage outlets, wherein the deflector is a first deflector having a first set of geometric characteristics, the deflector removable from the housing and replaceable by a second deflector having a second set of geometric characteristics different from the first set of geometric characteristics, wherein the first deflector is one of a first class of deflectors and the second deflector is one of a second class of deflectors, the first and second class of deflectors respectively defining first and second exhaust flow profiles that differ from each other.

There is also provided, in accordance with another aspect, a method of modifying an exhaust assembly interconnecting a thermal engine to a turbine in an aircraft engine, the exhaust assembly having a deflector enclosed within a housing, the method comprising: determining that a parameter indicative of a performance of the aircraft engine is below a given threshold; and improving the performance of the aircraft engine to bring the parameter above the given threshold, by removing the deflector from the housing and replacing the deflector by a substitute deflector, including selecting the substitute deflector from a set of classified deflectors, the set of classified deflectors including a first class of deflectors and at least a second class of deflectors, the first class of deflectors and the second class of deflectors differing from each other by one or more geometric characteristics which respectively define a first flow profile for the first class of deflectors and a second flow profile for the second class of deflectors, the first flow profile being different than the second flow profile.

There is further provided, in accordance with another aspect, an exhaust assembly for interconnecting a thermal engine to an axial turbine, comprising: a housing extending circumferentially about a central axis and having an inlet extending tangentially relative to a circumference of the housing and an outlet extending circumferentially about the central axis and oriented axially relative to the central axis, the housing including a first housing section and a second housing section detachably secured to the first housing section, the first and second housing sections defining a deflector-receiving cavity between the first and second housing sections; and a deflector removably mounted within the deflector-receiving cavity, the deflector having vanes circumferentially distributed about the central axis, flow passages interspaced between the vanes, the flow passages curving from passages inlets to passage outlets.

BRIEF DESCRIPTION OF THE DRAWINGS

Reference is now made to the accompanying figures in which:

FIG. 6 is a cutaway view of the exhaust assembly of FIG. 3;

FIG. 7 is another exploded cross-sectional view of the exhaust assembly of FIG. 3;

FIG. 8 is a three dimensional view of the exhaust assembly of FIG. 3 and two different deflector of different classes that may be installed in the exhaust assembly; and FIG. 9 is a flowchart illustrating steps of a method of modifying an exhaust assembly interconnecting a thermal engine to a turbine in accordance with one embodiment.

DETAILED DESCRIPTION

Figure 1:
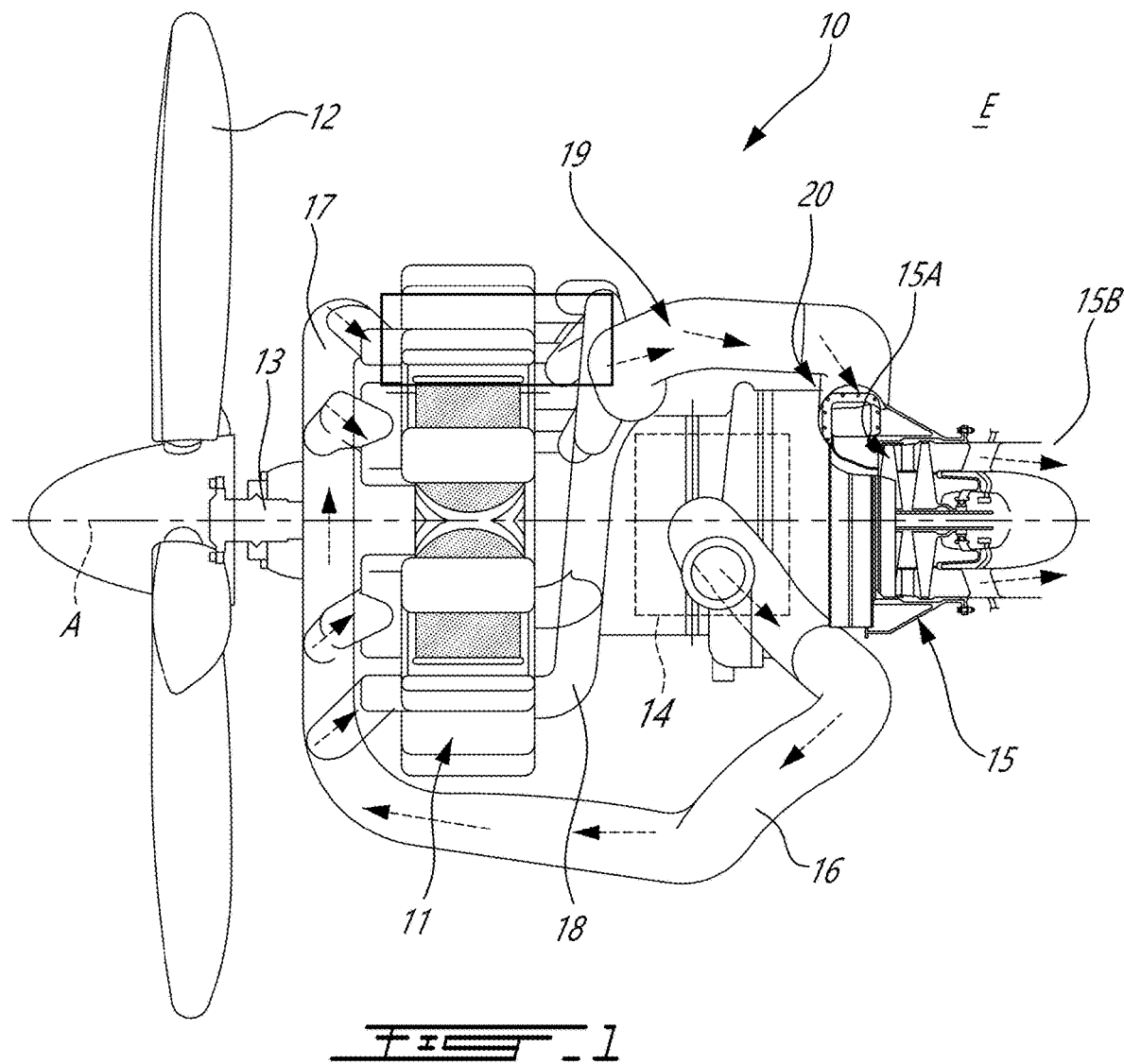
FIG. 1 is a schematic side view of an aircraft engine in accordance with one embodiment.

Referring to FIG. 1, an aircraft engine is shown at 10 and includes a thermal engine 11, such as an internal combustion engine, drivingly engaged to a rotatable load 12, herein depicted as a propeller, via an output shaft 13. The output shaft 13 may correspond to an engine shaft of the thermal engine 11. The thermal engine 11 may be any engine having at least one combustion chamber of varying volume. For instance, the thermal engine 11 may be a piston engine or a rotary engine. The aircraft engine 10 includes a compressor 14 having a compressor inlet receiving ambient air from the environment E outside the aircraft engine 10 and a compressor outlet fluidly connected to an air inlet of the thermal engine 11. The aircraft engine 10 further includes a turbine 15 having a turbine inlet 15A fluidly connected to an engine outlet of the thermal engine 11. The turbine 15 has a turbine outlet 15B via which combustion gases are expelled to the environment E outside the aircraft engine 10.

In the embodiment shown, the compressor 14 outputs compressed air from the compressor outlet to the thermal engine via a compressed air conduit 16 and a manifold 17. The compressed air conduit 16 and the manifold 17 may include any suitable arrangement of pipes configured to distribute compressed air between the different combustion chambers of the thermal engine 11. Any other suitable configurations used to supply compressed air to the thermal engine 11 are contemplated without departing from the scope of the present disclosure.

The engine outlet of the thermal engine 11 is fluidly connected to an exhaust manifold 18 that receives combustion gases outputted by the combustion chambers of the thermal engine 11. The exhaust manifold 18 collects the combustion gases from the different combustion chambers and flows these combustion gases to a combustion gases conduit 19 that feeds the combustion gases to the turbine 15. In other words, the engine outlet of the thermal engine 11 is fluidly connected to the turbine inlet 15A via the exhaust manifold 18 and the combustion gases conduit 19. Any other suitable configurations used to supply combustion gases to the turbine 15 are contemplated without departing from the scope of the present disclosure.

Figure 2:
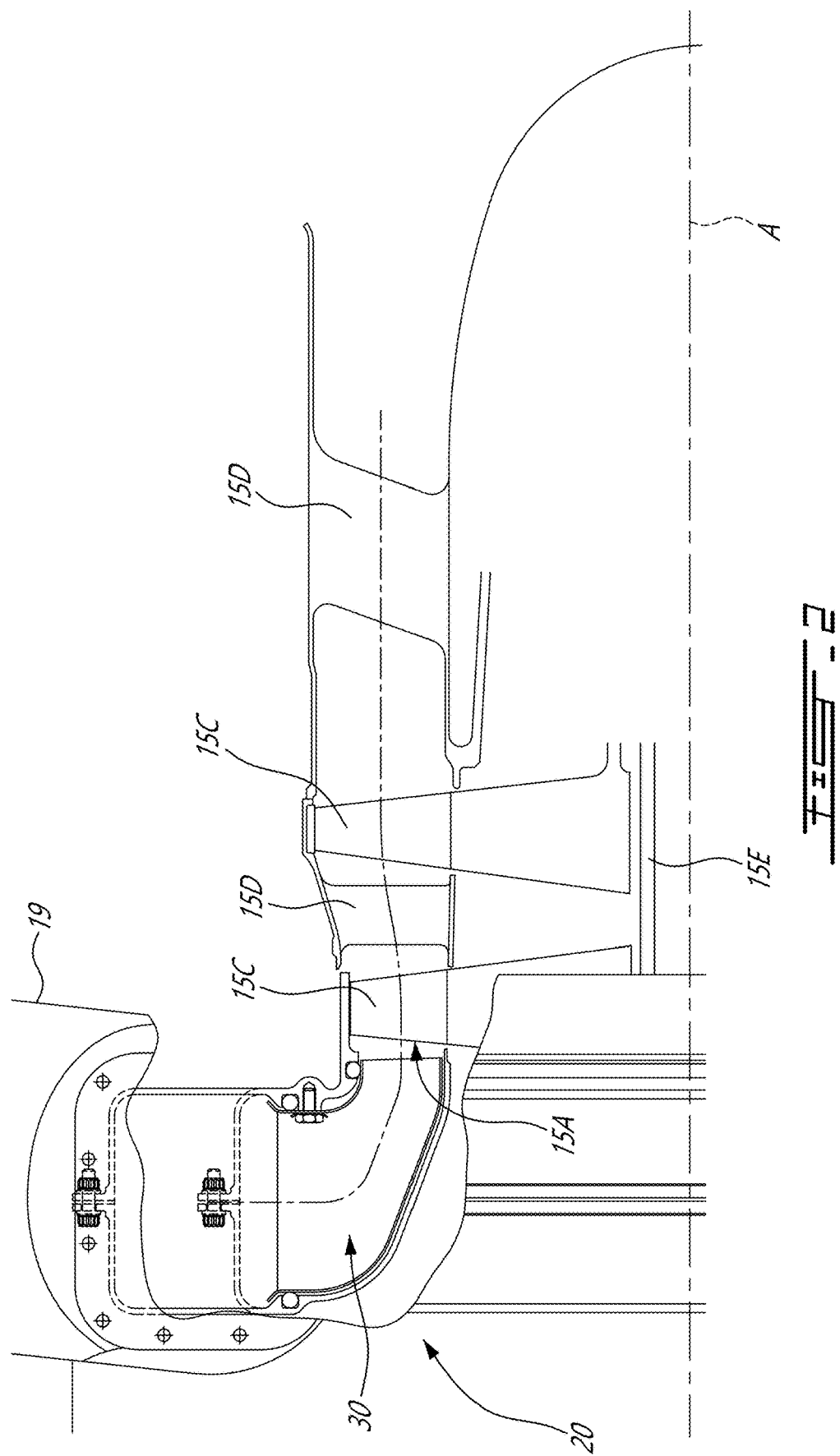
FIG. 2 is a side cross-sectional view of a portion of the aircraft engine of FIG. 1 illustrating an exhaust assembly and an axial turbine thereof.

Referring to FIGS. 1-2, in the present embodiment, the turbine 15 is an axial turbine having successive rows of rotors 15C and stators 15D disposed in alternation along a central axis A of the aircraft engine 10. The rotors 15C may include rotor blades mounted to rotor discs. The stators 15D may include stator vanes secured at opposite ends to inner and outer shrouds. In other words, the turbine 15 may include a plurality of stages each including a stator and a rotor. The rotors 15C of the turbine 15 are in driving engagement with a turbine shaft 15E. The turbine shaft 15E may be drivingly engaged to the output shaft 13, which may correspond to the engine shaft of the thermal engine 11. Therefore, the turbine 15 may compound power with the thermal engine 11 to drive the rotatable load 12. In other words, the turbine shaft 15E may be drivingly engaged to the engine shaft of the thermal engine 11. In the embodiment shown, the turbine shaft 15E is drivingly engaged to a compressor shaft of the compressor 14. Thus, the turbine 15 may drive the rotatable load 12 and the compressor 14. In the present embodiment, the engine shaft of the thermal engine 11, the output shaft 13, and the turbine shaft 15E are all coaxial about the central axis A. However, in other configurations, the turbine 15 and/or the compressor 14 may have respective shafts radially offset from one another relative to the central axis A.

As illustrated, the combustion gases are flowing within the combustion gases conduit 19 and reach the turbine 15 in a direction being mainly radial relative to the central axis A. However, the turbine 15 is an axial turbine and therefore the turbine inlet 15A receives the combustion gases along a direction being mainly axial relative to the central axis A. To redirect the combustion gases from a direction being mainly radial to a direction being mainly axial, the aircraft engine 10 further includes an exhaust assembly 20 that reorients the combustion gases so that they meet an upstream most of the stages of the turbine 15 at the most appropriate angle of attack. In the embodiment shown, the combustion exiting the exhaust assembly 20 meets a rotor 15C of the turbine 15 before meeting a stator thereof. The exhaust assembly 20 may therefore be used to adequately orient the combustion gases at the most appropriate angle to meet the upstream-most airfoils of the turbine 15, which are herein part of one of the rotors 15C. Thus, the turbine 15 may be devoid of a stator between the exhaust assembly 20 and an upstream-most of the rotors 15C.

Figure 3:
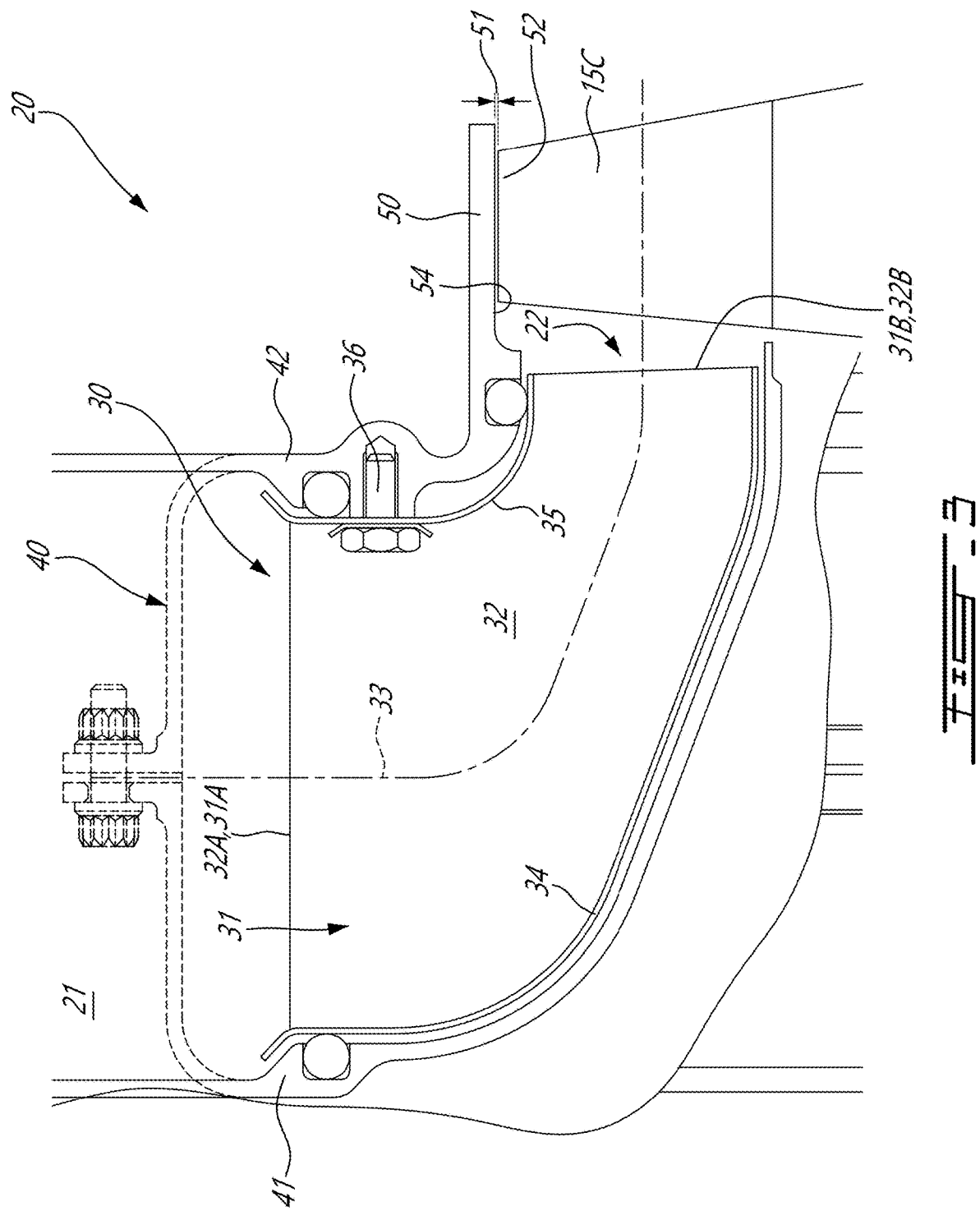
FIG. 3 is an enlarged view of a portion of FIG. 2 illustrating the exhaust assembly in accordance with one embodiment.
Figure 4:
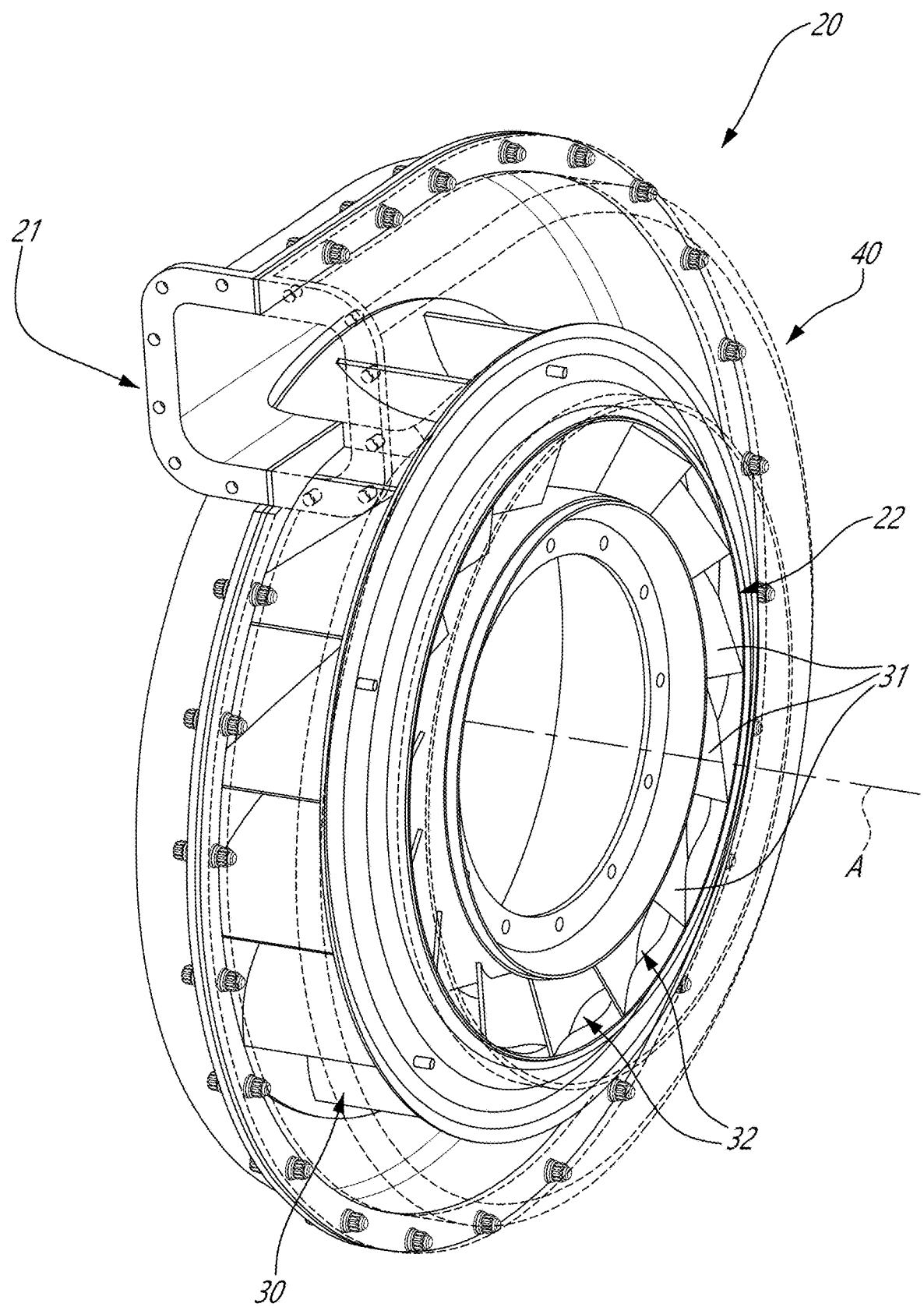
FIG. 4 is a three dimensional partially transparent view of the exhaust assembly of FIG. 3.

Referring now to FIGS. 3-4, the exhaust assembly 20 has an inlet 21 fluidly connected to the combustion gases conduit 19 and has an outlet 22 fluidly connected to the turbine 15. As illustrated in FIG. 4, the inlet 21 faces the direction being mainly circumferential relative to the central axis and the outlet 22 faces a direction being mainly axial relative to the central axis A. In the context of the present disclosure, the expression "mainly radial" implies that 50% or more of the direction is oriented radially relative to the central axis A. The expression "mainly axial" implies that 50% or more of the direction is oriented axially relative to the central axis A. The outlet 22 may face a direction substantially devoid of a radial component. The direction faced by the outlet 22 has a component in the axial direction greater than a component in the radial direction. The direction faced by the outlet 22 may have a component in the circumferential direction.

The exhaust assembly 20 includes generally a deflector 30 that is removably mounted within a housing 40. As will be explained in further detail below, in a particular embodiment the housing 40 may includes a first housing section 41 and a second housing section 42 that can be separated, when disassembled, to permit the deflector 30 to be removed from the housing 40 and replaced by another deflector as will be described below. In the embodiment of FIGS. 2-3 the second housing section 42 of the housing 40 includes a shroud wall 50 that extends axially in a downstream direction away from the main body main body of the housing 40, towards the turbine 15 of the engine 10. The shroud wall 50 extends circumferentially about the axis A, and circumscribes, radially outwardly from, the first stage turbine rotor 15c of the turbine 15. As noted above, the turbine 15 in this embodiment is devoid of a stator between the exhaust assembly 20 and an upstream-most of the rotors 15C. Accordingly, and as best seen in FIG. 3, a radial tip clearance gap 51 is defined between the radially outer tips 52 of the first stage (or most upstream) turbine rotor 15c and a radially inwardly facing surface 54 of the axially extending shroud wall 50 of the housing 40.

The housing 40 defines the inlet 21 and the outlet 22 of the exhaust assembly 20. The housing 40 extend circumferentially about the central axis A, and the inlet 21 extends tangentially relative to a circumference of the housing. In the embodiment shown, a cross-sectional area of the housing 40 at the inlet 21 of the housing 40, in a plane containing the central axis A, is square or rectangular. The outlet 22 of the housing 40 extends circumferentially about the central axis A and is oriented axially relative to the central axis A. Accordingly, combustion gases enter the housing 40 of the exhaust assembly 20 in a generally tangential direction, and exit the housing 40 in a generally axial direction to flow to the axial turbine located downstream of the exhaust assembly 20.

The deflector 30 is removably mounted within the housing 40, and includes vanes 31 circumferentially distributed about the central axis A. Flow passages 32 are interspaced between the vanes 31. The flow passages 32 curve from passages inlets 32A at leading edges 31A of the vanes 31 to passage outlets 32B at trailing edges 31B of the vanes 31. Axial components of passage axes 33 of the flow passages 32 increase from the passage inlets 32A to the passage outlets 32B. Radial components of the passage axes 33 decrease from the passage inlets 32A to the passage outlets 32B. In other words, the combustion gases flowing through the deflector 30 are re-oriented from being substantially radial and circumferential to being substantially axial and circumferential relative to the central axis A. Thus, the deflector 30 deflects the combustion gases received via the inlet 21 of the exhaust assembly 20 until they are adequately oriented to meet the blades of the rotor of the turbine 15. The exhaust assembly 20 thus fluidly connects the engine outlet of the thermal engine 11 to the turbine inlet 15A of the turbine 15. The deflector 30 includes a first shroud 34 and an opposed second shroud 35. The vanes 31 extend from the first shroud 34 to the second shroud 35. The first and second shrouds 34, 35 curve from being oriented substantially radially at the passage inlets 32A of the flow passages 32 to being oriented substantially axially at the passage outlets 32B of the flow passages 32.

In some cases, manufacturing tolerances (in the case of new engine builds) and operational wear and/or operating conditions (in the case of repair and overall of engines in service) may result in two otherwise similar aircraft engines exhibiting differences in their respective performance at different stages of the engines' useful lifetime. For example, one engine of a given model that is subjected to one set of uses and operating conditions may cause wear and tear to, and the resulting performance of, that engine that are different than the wear and tear, and the performance, of a different engine of that same model that is subjected to a different set of uses and operating conditions over a similar timeframe. One of these engines may thus perform different from the other engine after a same number of hours of use. In some cases, this may cause an aircraft engine to have a performance below a given threshold. The performance may for example be measured/determined by one or more of specific fuel consumption, surge margin, or any other suitable performance metrics of the aircraft engine. Other performance parameters may be selected and used for a given operation, depending on the particular operation for example.

It is therefore possible to design a plurality of classes of deflectors 30 an apply them to reduce at least some of the differences in performance of different engines of a same model at different points of the engines' lifetimes. Deflectors of each classes may have respective geometric characteristics, such that the deflectors of each classes have their respective flow profiles. For instance, deflectors of a class "01" deflector define a flow area having a value of "X", whereas deflectors of a class "02" deflector have a flow area having a value of "Y" that is different than "X". The geometric characteristics may include one or more of thickness of the vanes, a camber of the vanes, a span of the vanes, an exit flow angle at the trailing edges of the vanes, and so on. The flow area of each of the classes of deflectors may, for example, be a cross-section area measured at the exit of the deflector, for example an area of a plane extending between the trailing edges of two adjacent vanes.

To improve performance of a given aircraft engine, it may be possible to replace the engine's deflector 30, which may be a first deflector, by a second deflector of a different class that provides different flow characteristics that are better suited for the particular physical state of that engine at that time, which may be at initial assembly when new, and/or at some later stage in the engine's lifetime. The first deflector thus has a first set of geometric characteristics, and the second deflector has a second set of geometric characteristics different from the first set of geometric characteristics. The first deflector may therefore be one of a first class of deflectors and the second deflector may be one of a second class of deflectors. The first and second classes of deflectors respectively define first and second flow profiles that differ from each other. The first and second flow profiles may differ by their respective flow areas, for example defined between trailing edges of circumferentially adjacent vanes of the deflectors. Any suitable geometric characteristics as described above may be varied to achieve this difference in the flow circulating area.

In some cases, this may be done when the aircraft engine is new and being assembled for the first time. The aircraft engine may be fitted with a nominal deflector expected to provide the optimal performance. Tests may then be conducted to determine if the performance of the aircraft engine is within a desired acceptable range before shipping the aircraft engine to a customer. If it is determined that the performance is below a predetermined threshold, performance may be improved (to thereby bring the performance of the engine above the predetermined threshold) by removing the nominal deflector from the housing 40 and replacing the deflector by a substitute deflector of a different class. This may include selecting the substitute deflector from a set of classified deflectors. As explained above, the set of classified deflectors includes a first class of deflectors and at least a second class of deflectors. In practice there may be a plurality of different classes of deflectors from which to choose from, each class providing slightly different geometric characteristics, and thus flow characteristics. The first class of deflectors and the at least a second class of deflectors differ from each other by one or more geometric characteristics which define a first flow profile for the first class of deflectors and a second flow profile for the second class of deflectors. The first flow profile is different than the second flow profile.

In some other embodiments, at engine overhaul, it may be determined that the wear and tear of the different components of the aircraft engine resulted in a drop of the performance of the aircraft engine below a predetermined threshold. To improve the performance, and thereby bring the performance of the engine above the predetermined threshold, the deflector currently installed on the aircraft engine is removed and replaced by a substitute deflector of any of the first and the at least second class of deflectors. The class of deflectors selected for the substitute deflector is made such as to modify the geometric characteristic of the deflector, and thus its flow characteristics and flow profile, in such a manner as to result in increased performance of the engine.

Figure 5:
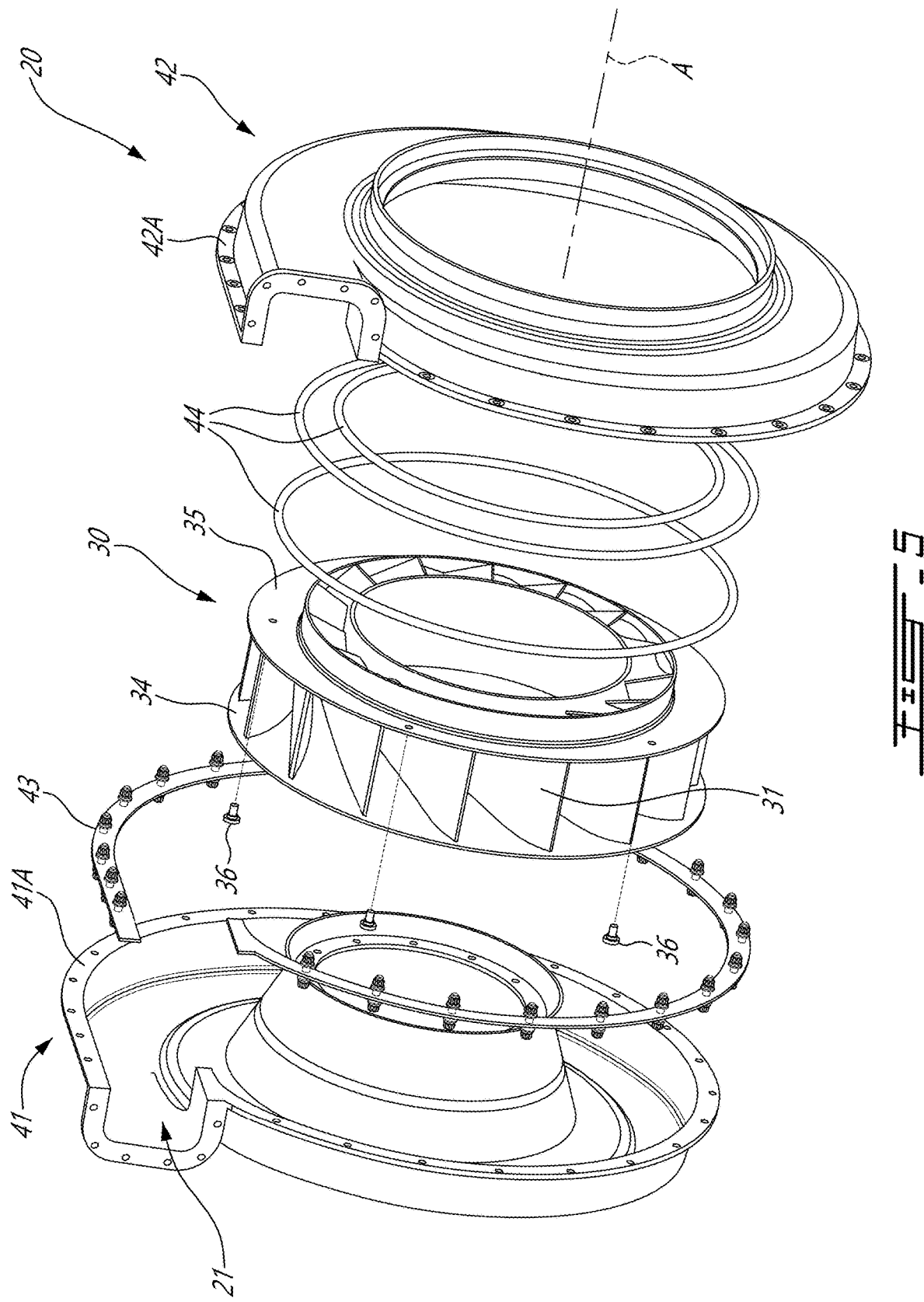
FIG. 5 is a three dimensional exploded view of the exhaust assembly of FIG. 3.

Referring to FIGS. 4-5, in the embodiment shown, the deflector 30 is removably mounted within the housing 40. By being removable as described herein, it is possible to substitute a deflector of another class for the deflector already installed in the aircraft engine 10 to improve performance of the aircraft engine 10. The housing 40 defines the inlet 21 and the outlet 22 of the exhaust assembly 20. The housing 40 extends circumferentially around the central axis A. The housing 40 includes a first housing section 41 and a second housing section 42 secured to the first housing section 42. As shown in FIG. 4, the housing 40 has an assembled configuration in which the deflector 30 is secured within the housing and, as shown in FIG. 5, the housing 40 has a disassembled configuration in which the deflector 30 may be removed from the housing 40. The deflector 30 is thus located between the first housing section 41 and the second housing section 42. In the present embodiment, the first housing section 41 and the second housing section 42 are disposed on opposite sides of a plane normal to the central axis A. The deflector 30 is herein located axially between the first housing section 41 and the second housing section 42, within a deflector-receiving cavity of the housing 40. Alternatively, the first housing section 41 and the second housing section 42 may disposed on opposite sides of a plane parallel to the central axis A. The assembled configuration corresponds to a configuration of the housing 40 in which the two housing sections are secured together to enclose the deflector 30. The disassembled configuration corresponds to a configuration of the housing 40 in which the two housing sections are at least partially separated from one another to permit removal of the deflector 30.

The first housing section 41 has a first peripheral flange 41A and the second section 42 has a second peripheral flange 42A. The first peripheral flange 41A is detachably secured to the second peripheral flange 42A via any suitable fastening means, such as, for instance, clamps, fasteners, and so on. A sealing member 43 is sandwiched between the first peripheral flange 41A and the second peripheral flange 42A to limit the combustion gases from leaking out of the housing 40. Any other suitable ways of securing the two housing sections together are contemplated without departing from the scope of the present disclosure. In some embodiments, the two housing sections may be pivotably (e.g., via a hinge) connected to one another.

Referring to FIG. 5-6, in the embodiment shown, the deflector 30 is removably mounted to the housing 40 via one or more of the first shroud 34 and the second shroud 35. In the present case, the second shroud 35 of the deflector 30 is secured to the second housing section 42. In the present embodiment, fasteners 36 such as dowels, bolts, or pins may be used for that purpose. The fasteners 36 extend through an aperture 35A defined through the second shroud 35 and within a bore 42B defined by the second housing section 42 upon the aperture 35A in register with the bore 42B. The fasteners 36 may be distributed circumferentially around the central axis A.

Referring more particularly to FIG. 7, dampers 44, herein rope seals, are disposed between the first and second shrouds 34, 35 and the first and second housing sections 41, 42. The dampers 44 extend circumferentially annularly all around the central axis A. The dampers 44 sit in correspondingly sized slots, namely upstream slots 41C, 42C and downstream slots 41D, 42D of the first and second housing sections 41, 42. Put differently, four dampers 44 are disposed adjacent or at the four corners of the deflector 30. The dampers 44 received within the upstream slots 41C, 42C are located proximate the passage inlets 32A of the flow passages 32 whereas the dampers 44 received within the downstream slots 41D, 42D are located proximate the passage outlets 32B of the flow passages 32. The dampers 44 may be used to dampen undesired movements of the deflector 30 relative to the housing 40.

Still referring to FIG. 7, to assemble the exhaust assembly 20, the deflector 30 may be disposed between the first housing section 41 and the second housing section 42. Then, the first housing section 41 may be moved towards the second housing section 42 to sandwich the deflector 30 there between. The dampers 44 may become compressed between the housing sections and the deflector 30. The two housing sections 41, 42 may be secured to one another via any suitable means such as fasteners securing together their respective peripheral flanges 41A, 42A. The sealing member 43 (FIG. 5) may be disposed between the peripheral flanges 41A, 42A to limit combustion gases from leaking out of the housing 40. During the assembly, the deflector 30 may be secured first to one of the two housing sections 41, 42, herein to the second housing section 42 via the fasteners 36. The fasteners 36, as described above, may be received within registering apertures or bores defined by the deflector 30 and the second housing section 42. It may be required to rotate the deflector 30 relative to the second housing section 42 to align the apertures such that the fasteners 36 may be properly inserted.

Referring now to FIG. 8, the disclosed exhaust assembly 20 having the deflector 30 removable from the housing 40 may allow to easily replace the deflector 30 with a deflector 130, 230 of another class as described above to improve performance of the aircraft engine 10. When the aircraft engine 10 is first assembled, it may undergo testing using the deflector 30. The deflector 30 may be a nominal deflector installed on all aircraft engine. If, during the testing, it is the determined that performance are not up to expectations, the deflector 30 may be replaced by either deflector 130, 230 of different classes. Therefore, the disclosed exhaust assembly 20 may allow the improving of performance of the aircraft engine 10 by allowing the easy replacement of the deflector 30.

Referring now to FIG. 9, a method of modifying an exhaust assembly is shown at 900. The method 900 includes determining that a parameter indicative of a performance of the deflector 30 is below a given performance threshold at 902; and improving performance of the aircraft engine (to thereby bring the performance of the engine back above the given performance threshold) by removing the deflector 30 from the housing 40 and replacing the deflector by a substitute deflector 130, 230 at 904. The method 900 includes selecting the substitute deflector 130, 230 from a set of classified deflectors, the set of classified deflectors including a first class of deflectors and at least a second class of deflectors, the first class of deflectors and the second class of deflectors differing from each other by one or more geometric characteristics which define a first flow profile for the first class of deflectors and a second flow profile for the second class of deflectors, the first flow profile being different than the second flow profile.

The improving of the performance at 904 may include improving one or more of a specific fuel consumption and a surge margin of the aircraft engine.

The removing of the deflector at 904 from the housing at 904 may include separating the first housing section 41 of the housing 40 from the second housing section 42 and removing the deflector 30 from the deflector-receiving cavity defined between the first housing section 41 and the second housing section 42.

In the embodiment shown, the deflector differs from the substitute deflector by one or more of a flow circulating area defined between trailing edges of the vanes, a thickness of the vanes, a camber of the vanes, a span of the vane, an exit flow angle at the trailing edges of the vanes The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. An aircraft engine, comprising:
 a thermal engine having an engine inlet and an engine outlet;
 an axial turbine having a turbine inlet; and
 an exhaust assembly fluidly connecting the engine outlet of the thermal engine to the turbine inlet of the axial turbine, the exhaust assembly having a exhaust inlet fluidly connected to the engine outlet and an exhaust outlet fluidly connected to the turbine inlet, the exhaust assembly including:
  a housing extending circumferentially about a central axis, the housing having an outer wall and an inner wall disposed radially inwardly of the outer wall relative to the central axis, the inner wall and the outer wall curving from a radial orientation at the exhaust inlet to an axial orientation at the exhaust outlet, the exhaust outlet being annular and defined radially between the inner wall and the outer wall; and a deflector removably mounted within the housing, the deflector having vanes circumferentially distributed about the central axis, flow passages interspaced between the vanes, the flow passages curving from passages inlets to passage outlets, axial components of passage axes of the flow passages increasing from the passage inlets to the passage outlets, wherein the deflector is a first deflector having a first set of geometric characteristics, the deflector removable from the housing and replaceable by a second deflector having a second set of geometric characteristics different from the first set of geometric characteristics, wherein the first deflector is one of a first class of deflectors and the second deflector is one of a second class of deflectors, the first and second class of deflectors respectively defining first and second exhaust flow profiles that differ from each other.

2. The aircraft engine of claim 1, wherein the first flow profile is defined by a first flow area defined between first trailing edges of circumferentially adjacent vanes of the first deflector, the second flow profile is defined by a second flow area defined between second trailing edges of circumferentially adjacent vanes of the second deflector, the first flow area different than the second flow area.

3. The aircraft engine of claim 1, wherein the housing includes a first housing section and a second housing section detachably secured to the first housing section.

4. The aircraft engine of claim 1, wherein the deflector includes a first shroud and a second shroud, the vanes extending from the first shroud to the second shroud, the deflector removably mounted to the housing via one or more of the first shroud and the second shroud.

5. The aircraft engine of claim 4, wherein the deflector is mounted to the housing via the one or more of the first shroud and the second shroud via pins circumferentially distributed about the central axis, the pins securing the first shroud to the housing.

6. The aircraft engine of claim 4, comprising dampers disposed between the first shroud and the housing and between the second shroud and the housing.

7. The aircraft engine of claim 6, wherein the dampers are rope seals annularly extending around the central axis.

8. The aircraft engine of claim 1, wherein the thermal engine has an engine shaft drivingly engaged to a rotatable load, the axial turbine drivingly engaged to the engine shaft to compound power with the thermal engine.

9. The aircraft engine of claim 8, comprising a compressor in driving engagement with the axial turbine, the compressor having a compressor inlet receiving ambient air and a compressor outlet fluidly connected to the engine inlet.

10. The aircraft engine of claim 9, wherein the axial turbine is devoid of a stator between the exhaust outlet and an upstream-most rotor of the axial turbine.

11. The aircraft engine of claim 10, wherein the housing includes a shroud wall that extends axially downstream towards the axial turbine, and a radial tip clearance gap is defined between radially outer tips of the upstream-most rotor of the axial turbine and a radially inwardly facing surface the shroud wall of the housing.

12. An exhaust assembly for interconnecting a thermal engine to an axial turbine, comprising:
a housing extending circumferentially about a central axis and having an inlet extending tangentially relative to a circumference of the housing and an outlet extending circumferentially about the central axis and oriented axially relative to the central axis, the housing including a first housing section and a second housing section detachably secured to the first housing section, the first and second housing sections defining a deflector-receiving cavity between the first and second housing sections, the housing having an outer wall and an inner wall disposed radially inwardly of the outer wall relative to the central axis, the inner wall and the outer wall curving from a radial orientation at the inlet to an axial orientation at the outlet, the outlet being annular and defined radially between the inner wall and the outer wall; and
a deflector removably mounted within the deflector-receiving cavity, the deflector having vanes circumferentially distributed about the central axis, flow passages interspaced between the vanes, the flow passages curving from passages inlets to passage outlets.

13. The exhaust assembly of claim 12, wherein a cross-sectional area of the housing at the inlet of the housing is square or rectangular.

14. The exhaust assembly of claim 12, wherein axial components of the flow passages increase in a direction from the passage inlets toward the passage outlets.

15. The exhaust assembly of claim 12, wherein the deflector includes a first shroud and a second shroud, the vanes extending from the first shroud to the second shroud, the deflector removably mounted to the housing via one or more of the first shroud and the second shroud.

16. The exhaust assembly of claim 15, comprising dampers disposed between the first shroud and the housing and between the second shroud and the housing.

* * * * *